United States Patent
Mehta et al.

(10) Patent No.: US 9,646,358 B2
(45) Date of Patent: May 9, 2017

(54) METHODS FOR SCENE BASED VIDEO WATERMARKING AND DEVICES THEREOF

(71) Applicant: Infosys Limited, Bangalore (IN)

(72) Inventors: Sachin Mehta, Kangra (IN); Rajarathnam Nallusamy, Trichy Dist. (IN)

(73) Assignee: Infosys Limited, Bangalore (IN)

( * ) Notice: Subject to any disclaimer, the term of this patent is extended or adjusted under 35 U.S.C. 154(b) by 47 days.

(21) Appl. No.: 14/491,626

(22) Filed: Sep. 19, 2014

(65) Prior Publication Data

US 2015/0086067 A1    Mar. 26, 2015

(30) Foreign Application Priority Data

Sep. 20, 2013    (IN) .......................... 4233/CHE/2013

(51) Int. Cl.
*G06K 9/00*    (2006.01)
*G06T 1/00*    (2006.01)

(52) U.S. Cl.
CPC .......... *G06T 1/0085* (2013.01); *G06T 1/0071* (2013.01); *G06T 2201/0081* (2013.01)

(58) Field of Classification Search
CPC ................. G06T 1/0085; G06T 1/0071; G06T 2201/0081; G06T 2207/10016

USPC .......................................................... 382/100
See application file for complete search history.

(56) References Cited

U.S. PATENT DOCUMENTS

| | | | | |
|---|---|---|---|---|
| 5,805,733 A | * | 9/1998 | Wang ................ | G06F 17/30802 382/232 |
| 2006/0239501 A1 | * | 10/2006 | Petrovic ................ | G06T 1/0028 382/100 |
| 2010/0172539 A1 | | 7/2010 | Sugimoto et al. | |
| 2012/0148089 A1 | * | 6/2012 | Vashistha ................ | G06T 1/005 382/100 |

FOREIGN PATENT DOCUMENTS

WO    2007015452 A1    7/2007

\* cited by examiner

*Primary Examiner* — Andrew Moyer
(74) *Attorney, Agent, or Firm* — LeClairRyan

(57) ABSTRACT

A method, device and non-transitory computer readable medium for scene based video watermarking. Methods are disclosed to detect the scenes inside the video. Disclosed devices and methods are capable of scene change detection for both, gradual and abrupt scenes. Methods are also disclosed to group logical scenes in a video. The disclosed methods are aided with methods to reduce the computational time taken for scene change detection. Watermarks are created and segmented using a plurality of unique identifiers to limit any unauthorized use of the video.

9 Claims, 9 Drawing Sheets

METHODS FOR SCENE BASED VIDEO WATERMARKING AND DEVICES THEREOF

This application claims the benefit of Indian Patent Application No. 4233/CHE/2013 filed Sep. 20, 2013, which is hereby incorporated by reference in its entirety.

FIELD

This technology generally relates to the field of video processing and, more particularly, to methods, devices, and non-transitory computer readable medium for video segmentation and digital watermarking.

BACKGROUND

With the advancement of technology, more and more media content has been migrated from analog to digital format. The convergence of networks, devices, and services combined with the technological advancements in digital storage, multimedia compression, and miniaturization of digital cameras has led to an explosive growth of online video content. In addition to the professionally produced video content, user-generated content and content produced by hardcore amateurs are also on the rise. Videos can easily be shared over the Internet using popular video sharing sites such as You Tube® and Yahoo!® Video. Although the user experience is enhanced with the new means of content production, distribution and monetization, it has made illegal reproduction and distribution of digital content easier. Piracy of digital media content is increasing day by day and is a major cause of worry for the digital content owners.

A video is a sequence of scenes and a scene is a sequence of images called frames. Increasing volumes of online digital video content and large amount of information contained within each video make it a challenge to search and retrieve relevant video files from a large collection. Video data management systems aim at reducing this complexity by indexing the video files. Indexing of video content as well as many digital watermarking algorithms require the video to be split into scenes. Scene change detection (hereinafter may be referred to as 'SCD') is used for segmentation of videos into contiguous scenes. SCD is instantly performed by human but vast computational resources and efficient complex algorithms are required to automate this process. Scene change detection in videos is a primary requirement of video processing applications used for the purpose of generating data needed by video data management systems. Scene change detection is a fundamental step in content based video retrieval systems, video annotation systems, video indexing methods and video data management systems. Scene changes in videos can either be gradual or abrupt. Abrupt scene changes can result from editing cuts. Gradual scene changes result from spatial effects such as zoom, camera pan and tilt, dissolve, fade in, fade out or the like. Detection of scene changes effectively depends on finding the similarity or the difference between adjacent frames. SCD usually involves measurement of some differences between successive frames. There are several ways to detect the scenes in a video. Pixel wise difference and histogram based difference are some of the techniques used to measure the inter-frame difference.

The existing scene change detection algorithms can be classified into two groups. One group is compressed domain which consists of algorithms that operate on compressed data and other group is uncompressed domain or pixel domain which consists of algorithms that operate on pixel data. The algorithms in compressed domain operate on compressed data, like algorithms based on Macro blocks in MPEG compressed video, algorithms based on motion characterization and segmentation for detecting scene changes in MPEG compressed video, algorithms based on statistical sequential analysis on compressed bit streams, algorithms based on feature extraction based on motion information and vectors or edges or luminance information. The algorithms in uncompressed domain or pixel domain operate on pixel data directly like algorithms based on color diagrams, algorithms based on color histogram and fuzzy color histogram, algorithms based on edge detection and edge difference examinations, algorithms based on background difference and tracking and object tracking. Efficient segmentation of videos into scenes enables effective management of videos. Also, segmentation of video into scenes can lead to effective watermark embedding. Generally, same watermark is embedded inside the video stream which makes it difficult to maintain the statistical and perceptual invisibility. Embedding a different watermark in different scenes can help in achieving statistical and perceptual invisibility and also makes it difficult for the attacker to extract the watermark.

A number of video watermarking algorithms are proposed by the researchers. These algorithms can be classified into two domains; spatial domain or pixel domain video watermarking and frequency domain or transform domain video watermarking. In spatial domain video watermarking, the watermark is embedded in the video frames by simple addition or bit replacement of selected pixels. These methods are computationally fast but less robust. In frequency domain video watermarking methods, the video frame is transformed and watermark is embedded in the transform coefficients. These methods are robust to common signal processing attacks like compression but require high computational time.

The existing technologies have various limitations. They do not identify the scene change with high precision and recall. The efficiency is low because of high false positive rate and false negative rate. Many algorithms are sensitive to motion of object and camera, like zooming and panning. Luminance variance results in scenes to be incorrectly segmented like in cases of excessive brightness change or flickering. Some algorithms fail in case of scene change involving frames of high motion. Algorithms do not consistently perform in cases like a fade, a dissolve or a wipe.

The existing processes have limitations such as video watermarking based methods are unable to carry large amount of information such as a string containing owner's name, responsible person's name and transaction date reliably and existing video watermarking methods embed same watermark for all the instances of video. Further, existing watermarking methods are not suitable for real time applications as they require high watermark embedding time. Most of the video watermarking algorithms do not embed watermark in real-time and hence, not suitable for real-time applications like on-the-fly video watermarking. This is due to the fact that the watermark embedding is done sequentially.

SUMMARY

This technology provides methods, devices, and non-transitory computer-readable media for detecting scene changes in a video and increasing the efficiency of scene change detection so as to detect scenes in real-time. Additionally, an example of a scene change detection algorithm is disclosed that is capable of detecting the abrupt as well as gradual scene changes.

Aspects of this technology relate to devices and methods for video processing. Additional aspects of this technology relate to devices and methods for detecting scenes in a video. Other aspects of this technology relate to devices and methods for increasing the efficiency of scene change detection in a video. Yet other aspects of this technology relate to devices and methods for grouping logical scenes of a video. Further aspects of this technology relate devices and methods for embedding and extracting a watermark.

BRIEF DESCRIPTION OF THE DRAWINGS

Features, aspects, and advantages of examples of this technology will be better understood when the following detailed description is read with reference to the accompanying drawings in which like characters represent like parts throughout the drawings, wherein.

DETAILED DESCRIPTION

Figure 1:
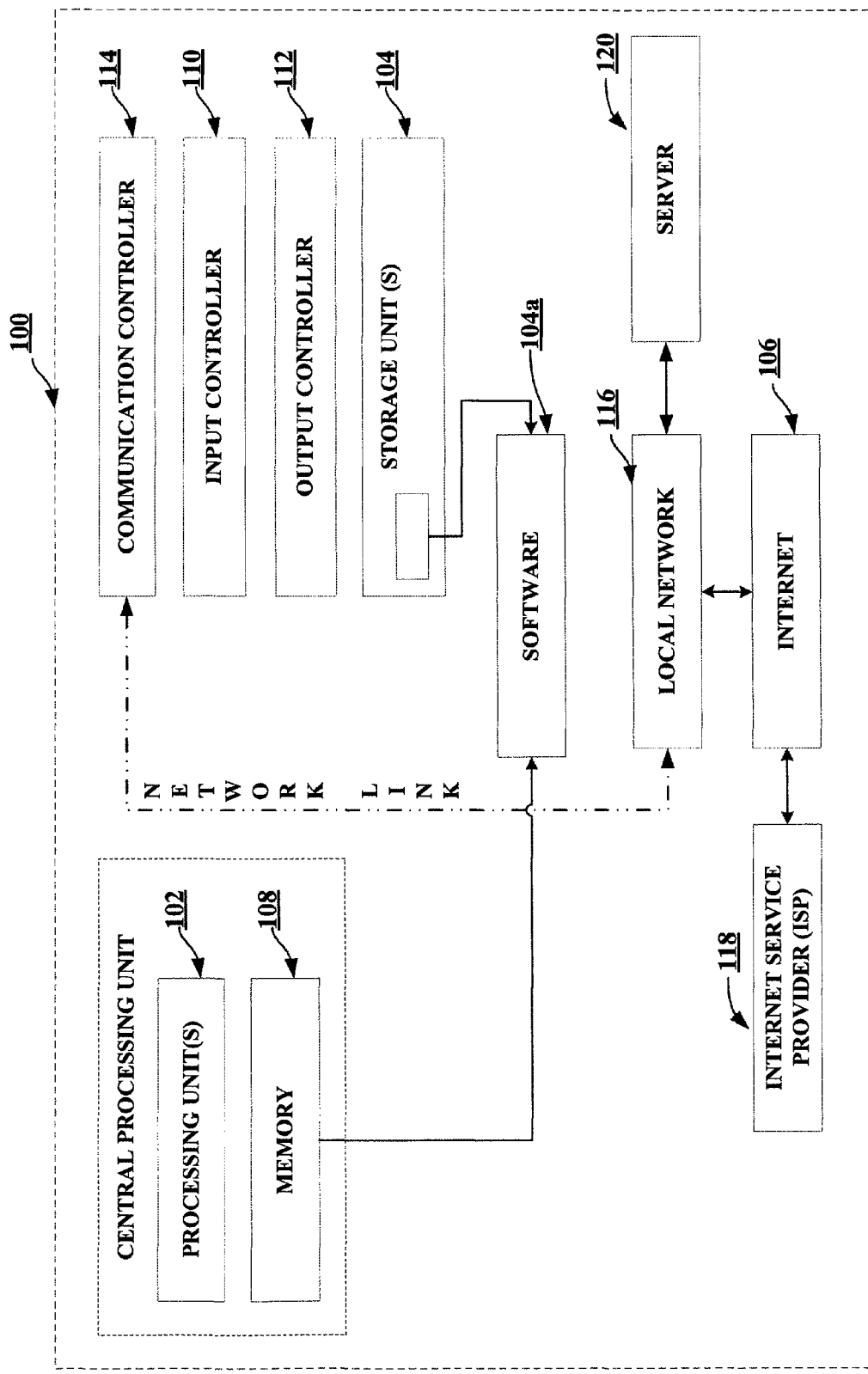
FIG. 1 is a block diagram of an example of a media management computing device.

Disclosed herein are examples of methods, devices, and non-transitory computer-readable media for detecting scene changes in a video and increasing the efficiency of scene change detection so as to enable an effective watermarking. Some of the examples illustrated and described herein relate to scene detection algorithms along with embodiments relating to logical grouping of scenes so as to enable an effective watermarking of videos. While the particular embodiments described herein may illustrate examples of this technology in examples of different particular domains, it should be understood that the broad principles behind these examples of the technology could be applied in other fields of endeavor and applications. To facilitate a clear understanding of this technology, illustrative examples are provided herein which describe certain aspects of the disclosure. However, it is to be appreciated that these illustrations are not meant to limit the scope of the disclosure, and are provided herein to illustrate certain concepts associated with the disclosure.

The following description is a full and informative description of the best example(s) of the method, device, and non-transitory computer readable medium presently contemplated for carrying out the present disclosure which is known to the inventors at the time of filing the patent application. Of course, many modifications and adaptations will be apparent to those skilled in the relevant arts in view of the following description, accompanied drawings and the appended claims. While the devices, non-transitory computer readable media, and methods described herein are provided with a certain degree of specificity, the present disclosure may be implemented with either greater or lesser specificity, depending on the needs of the user. Further, some of the features of the technology may be used to advantage without the corresponding use of other features described in the following paragraphs.

Any headings used herein are for organizational purposes only and are not meant to limit the scope of the description or the claims. As a preliminary matter, the definition of the term "or" for the purpose of the following discussion and the appended claims is intended to be an inclusive "or". That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." As used herein, the word "may" is used in a permissive sense rather than the mandatory sense. Similarly, the words "include", "including", and "includes" mean including, but not limited to.

It is also to be understood that this technology may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

Referring to FIG. 1, a block diagram of an example of a media management computing device 100. In this example, the media management computing device 100 includes at least one processor 102, designed to process instructions, for example computer readable instructions (i.e., code) stored on a storage device 104. By processing instructions, processing device 102 may by way of example perform the steps and functions disclosed herein, although the processing device 102 may execute other types and/or numbers of other functions and/or operations.

Storage device 104 may be any type of storage device, for example, but not limited to an optical storage device, a magnetic storage device, a solid state storage device and a non-transitory storage device. The storage device 104 may contain an application 104a which is a set of instructions (i.e. code). Alternatively, instructions may be stored in one or more remote storage devices, for example storage devices accessed over a network or the internet 106. The media management computing device 100 may also include an operating system and microinstruction code by way of example only. The various processes and functions described herein may either be part of the microinstruction code or part of the program (or combination thereof) which is executed via the operating system.

The media management computing device 100 additionally may have memory 108, an input controller 110, and an output controller 112 and communication controller 114, although media management computing device 100 may have other types and/or numbers of other systems, devices, components and/or other elements in other configurations. A bus (not shown) may operatively couple components of the media management computing device 100, including processor 102, storage device 104, memory 108, input controller 110 output controller 112, and any other devices (e.g., network controllers, sound controllers, etc.). Input controller 110 may be operatively coupled (e.g., via a wired or wireless connection) to input device (e.g., mouse, keyboard, touchpad, scroll-ball, touch-display, etc.) in such a fashion that input can be received from a user. Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet.

Members or subscribers of social media may be connected to the local network 116. A network link typically provides data communication through one or more networks to other data devices. For example, network link may provide a connection through local network 116 to a host computer, to data equipment operated by an ISP 118.

A server 120 may transmit a requested code for an application through internet 106, ISP 118, local network 116 and communication controller 114. The example of media management computing device 100 in FIG. 1 illustrates all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). In other examples, the media management computing device 100 may comprise one or more servers, for example a farm of networked servers, a clustered server environment, or a cloud network of computing devices.

Generally, the same watermark is embedded inside all the frames of a video. As a result, it is very difficult to maintain statistical and perceptual invisibility in videos. According to an example of this technology, a scene based watermarking method may be applied for both, gradual and abrupt scenes. One example of this method detects the scene change points and embeds independent as well as different segments of the watermark inside the scenes of a video in a cyclic manner. Scene change detection 500 in accordance with examples of this technology may be applied. Alternatively, other known SCD methods can be applied. Once the scenes are detected, segments of the watermark may be embedded inside all the scenes of the video.

Figure 2:
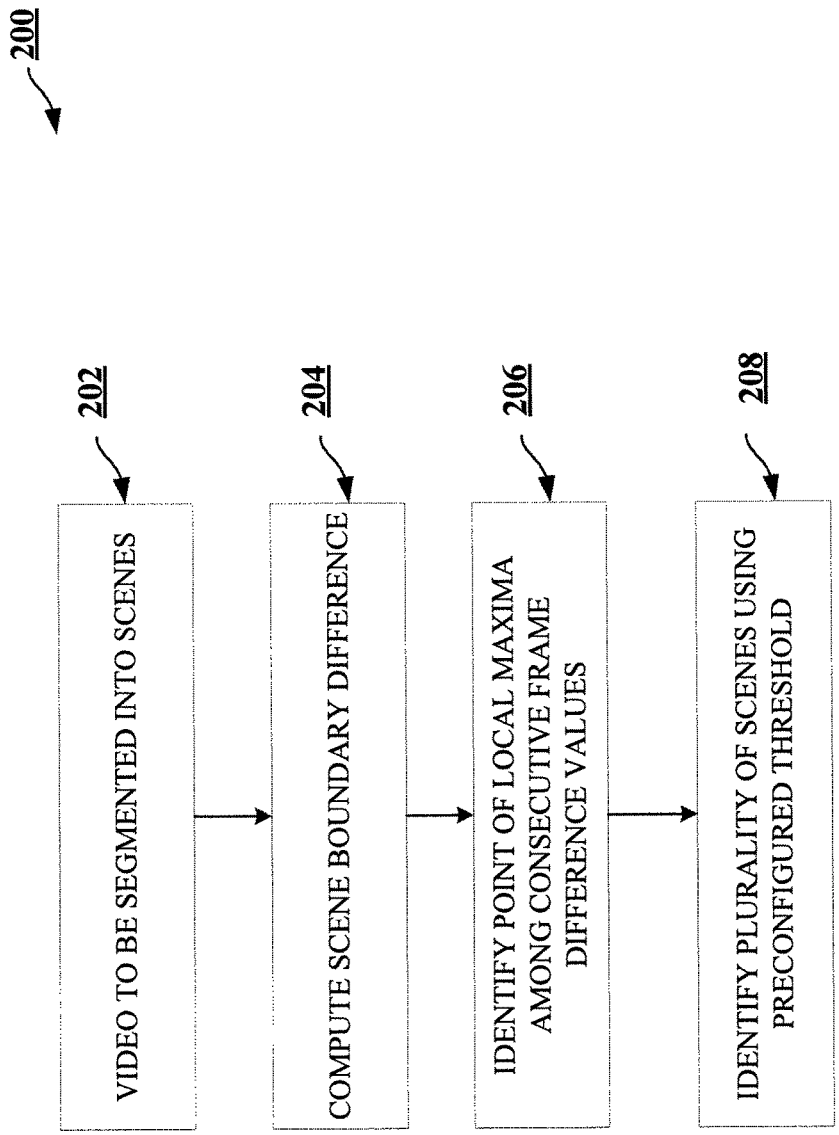
FIG. 2 is a diagram of an example of a method for detecting a scene change using a first pass algorithm.

Referring to FIG. 2, an example of a method 200 for detecting a scene change using a first pass algorithm. The final video in which the video is to be embedded is read and divided into scenes in step 202.

Suppose the total number of frames in the video to be segmented is N, then total N−1 frame difference values are computed and stored. Each frame is partitioned into rectangular blocks of sub-windows (w×w). The frame difference between two consecutive frames, $N_i$ and $N_{i+1}$ is calculated in step 204 for all frames of the input video using local $X^2$ color histogram comparison. Local maxima in a histogram represents the point of scene change. Peak values are points of local maxima and are identified among all stored N−1 frame difference values. A peak value is a frame difference value which is greater than both previous and next frame difference values.

There may be a large variation of the frame difference values obtained by applying this method and may be difficult to obtain information about connected frames of a scene. As a result, a sliding window detector is used to extract robust scene changes from frame differences by comparing the frame difference value of the frame corresponding to the point of local maxima in step 206. The sliding window detector ensures that the number of frames to be considered for frame difference is taken into account.

According to an example of this technology, weight for brightness grade change of each color space may be employed to calculate the difference among consecutive frames to make the scene change detection process robust against luminance changes. An appropriate threshold factor, X, is selected. The threshold value may be pre-configured based on one or more experimental values. Preferably, threshold factor ranging between 3~4 may be used. Threshold factor is used to identify those points of local maxima which fulfill the threshold condition. From these points of local maxima, the key frames are identified. If the peak value is greater than X times of average of the differences of the frames under consideration (frames under consideration are the number of frames in the sliding window), then the frame corresponding to this frame difference value is considered as key frame or the reference frame. The term, reference frame corresponds to the first frame of a new scene. Key frame is nothing but the start frame of a new scene. Thus in step 208, the first set of scene changes is obtained using first pass of the algorithm.

Figure 3:
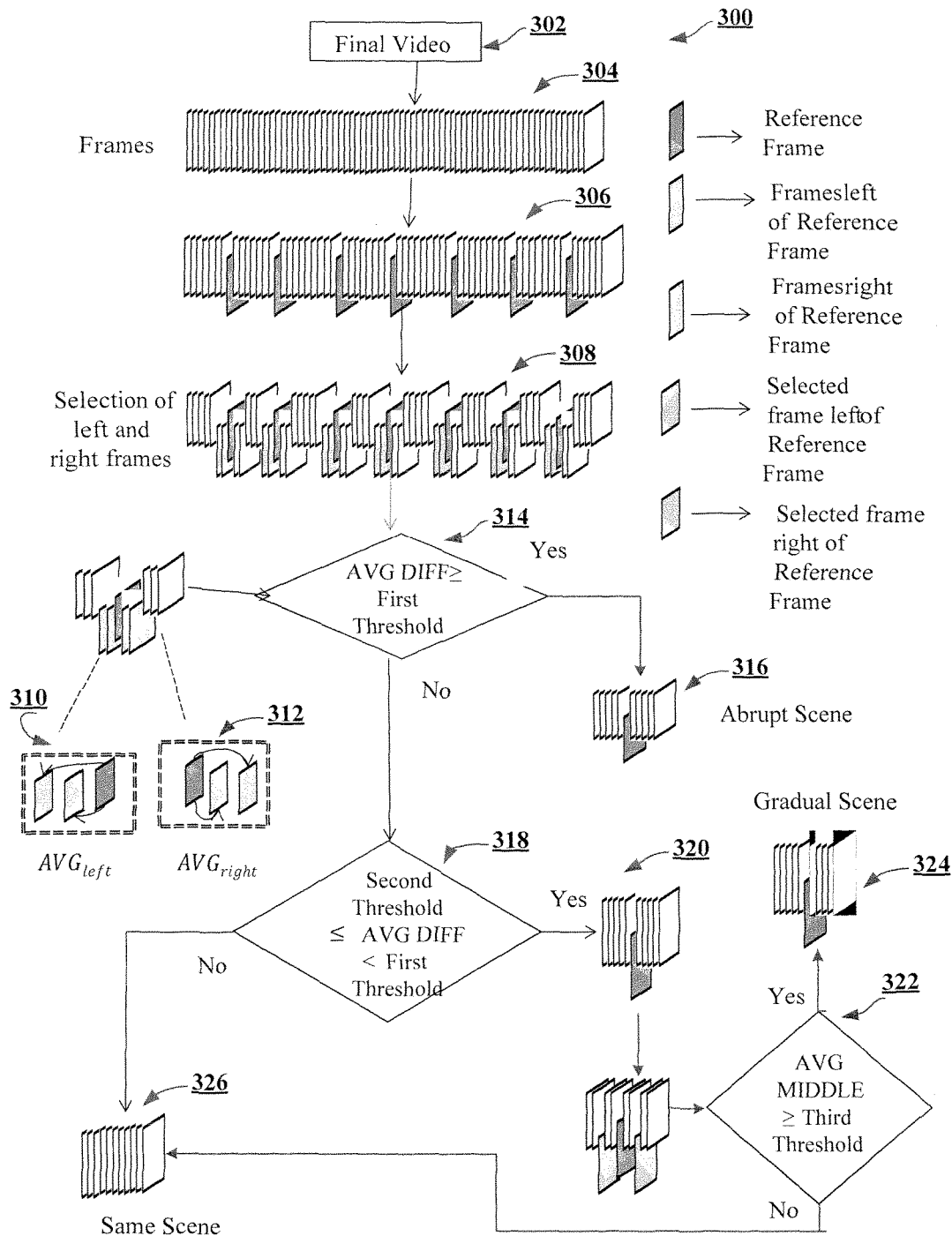
FIG. 3 is a diagram of an example of a method for detecting a scene change in a video using a second pass algorithm after the application of the first pass.

Referring to FIG. 3, an example of a method 300 for detecting a scene change in a video using the second pass algorithm after the application of the first pass is illustrated. The final video is read in step 302 and divided into the number of frames in step 304. First pass is applied in step 306 to calculate the scenes using by way of example the method 200 illustrated and described above with reference to FIG. 2, although other approaches could be used.

The scenes detected at the first pass may contain false scenes. The second pass inspects the scenes detected at the first pass and eliminates the false scenes. If the degree of change between adjacent scenes is high, then the scene can be marked as abrupt scene, otherwise it can be either a gradual scene or same scene and is further inspected. The degree of change between two adjacent scenes can be measured by selecting a reference frame. The term 'reference frame' means the key frame obtained in the first pass for each of the identified scenes. Frames to the left in step 308 mean frames whose number is less than the reference frame. Frames to the right in step 308 mean frames whose number is greater than the reference frame.

A 'left average' ($Avg_{left}$) in step 310 is computed by calculating the $\chi^2$ color histogram difference between the reference frame and the frames to its left and computing their average.

$$Avg_{left} = \frac{\Sigma_i d_{\chi^2}(F_{reference} - F_i)}{\text{Number of frames to the left}} \qquad \text{Equation I}$$

Where:
i denotes the number of frames to the left of reference frame
$d_{\chi}^2$ denotes the color histogram difference A 'right average' ($Avg_{right}$) in step 312 is computed by calculating the $\chi^2$ color histogram difference between the reference frame and the frames to the right and computing their average.

$$Avg_{right} = \frac{\Sigma_i d_{\chi 2}(F_{reference} - F_i)}{\text{Number of frames to the right}} \quad \text{Equation II}$$

Where:
i denotes the number of frames to the right of reference frame
$d_\chi^2$ denotes the color histogram difference The logarithmic difference between left average and the right average is calculated in step 314. This difference can be used to classify a scene as gradual or abrupt. If the difference between the left average and the right average is greater than a first pre-configured threshold then the scene may be classified as an abrupt scene in step 316. The first pre-configured threshold denotes a threshold for abrupt scenes which may be based on experimental values. If in step 318 the difference between the left average and the right average is less than the first pre-configured threshold and greater than a second pre-configured threshold then the scene may be classified as a gradual scene in step 320.

According to an example of this technology, scenes classified as gradual may be inspected further. A $\chi^2$ color histogram difference is calculated between the middle frames of the previous scene and the next scene.

$$\text{diff} = d_{\chi 2}\left(F_{\left|\frac{reference-previous}{2}\right|}, F_{\left|\frac{next-reference}{2}\right|}\right) \quad \text{Equation III}$$

where previous and next represents the first frame of the previous scene and last frame of the next scene.

If the scene is a gradual scene, then the difference (diff) will be too high and behave as an abrupt scene. If in step 322 the difference between the left and the right average is greater than a third pre-configured threshold then the scene may be classified as a gradual scene in step 324 else it may be classified as the same scene in step 326. The second pre-configured threshold and the third pre-configured threshold denotes thresholds for gradual scene which may be based on experimental values.

Figure 4:
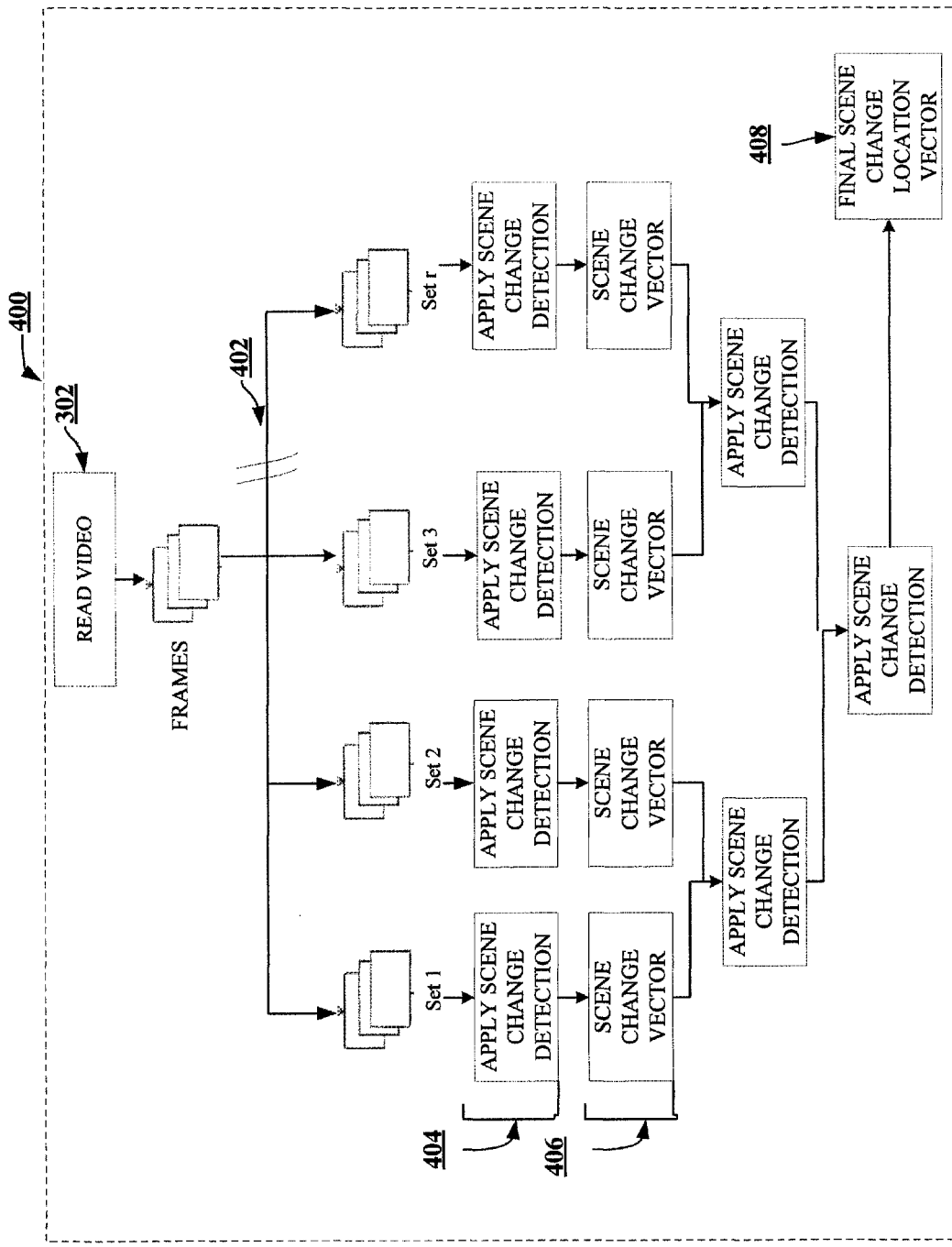
FIG. 4 is a diagram of an example of a method for improving the efficiency of scene change detection.
Figure 5:
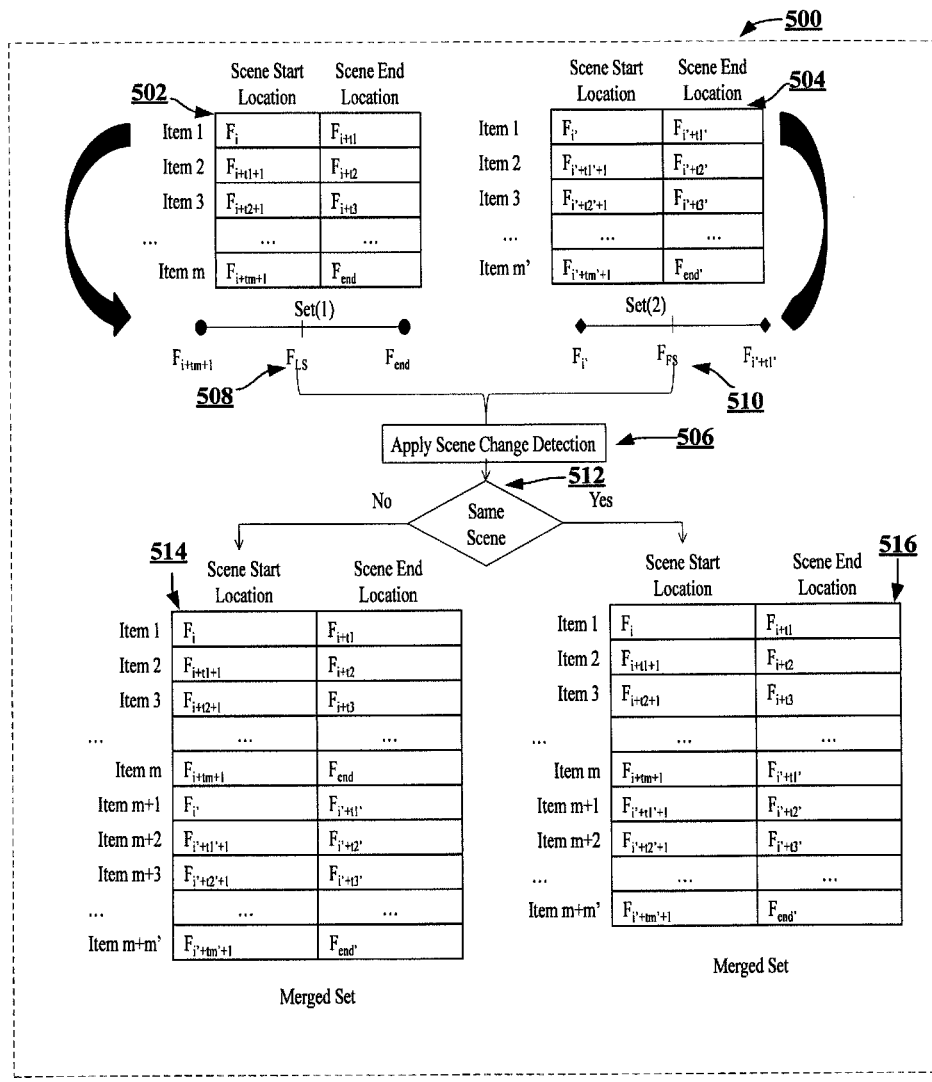
FIG. 5 is a diagram of an example of a method for merging one or more scenes, in parallel.

According to another example of this technology, the efficiency of scene change detection may be further improved. By way of example, the method illustrated and described with reference to FIG. 4 may be combined with the method illustrated and described with reference to FIG. 5 to improve the efficiency of scene change detection and merge scenes in parallel, respectively. The final video 302 in which the watermark is to be embedded is read and divided into frames. Suppose there are N frames in the video. The frames of the video are divided into equal or unequal sets 402 as applicable.

$$\text{Set}(i) = \begin{cases} N - \left((x-1) \times \left\lfloor \frac{N}{x} \right\rfloor\right), & \text{if } i = x \\ \left\lfloor \frac{N}{x} \right\rfloor, & \text{otherwise} \end{cases} \quad \text{Equation IV}$$

$N = \{\text{Set}(i)\}, 1 \le i \le x$

Where x is equivalent to the number of threads

Apply scene change detection algorithm on each set in parallel for each set 404, 502, 504. Each set is processed or handled by a different thread. A scene change vector is now obtained for each scene 406. The term, scene change vector designates a list containing the starting and end position of all the scenes present in that set. The size of scene change vector is equal to the number of detected scenes in that set 502, 504. These scene change vectors are merged to get the final scene change vector. Merging can be done either sequentially or in parallel by applying a scene change detection algorithm 506. To merge two scene change vectors, consecutive last $F_{LS}$ frames 508 from the last item (Item m) of Set (1) and first $F_{FS}$ frames 510 from the first item (Item 1) of Set (2) are selected. Scene change detection 506 in accordance with the present disclosure may be applied on these selected frames. If these frames belong to same scene 512, then these are combined 514 else considered as different scenes 516. This process is repeated till the final scene change vector is obtained 408. Method 600 in accordance with an example of this technology may be applied to group logical scenes. Alternatively, other methods may be employed to group logical scenes.

Figure 6:
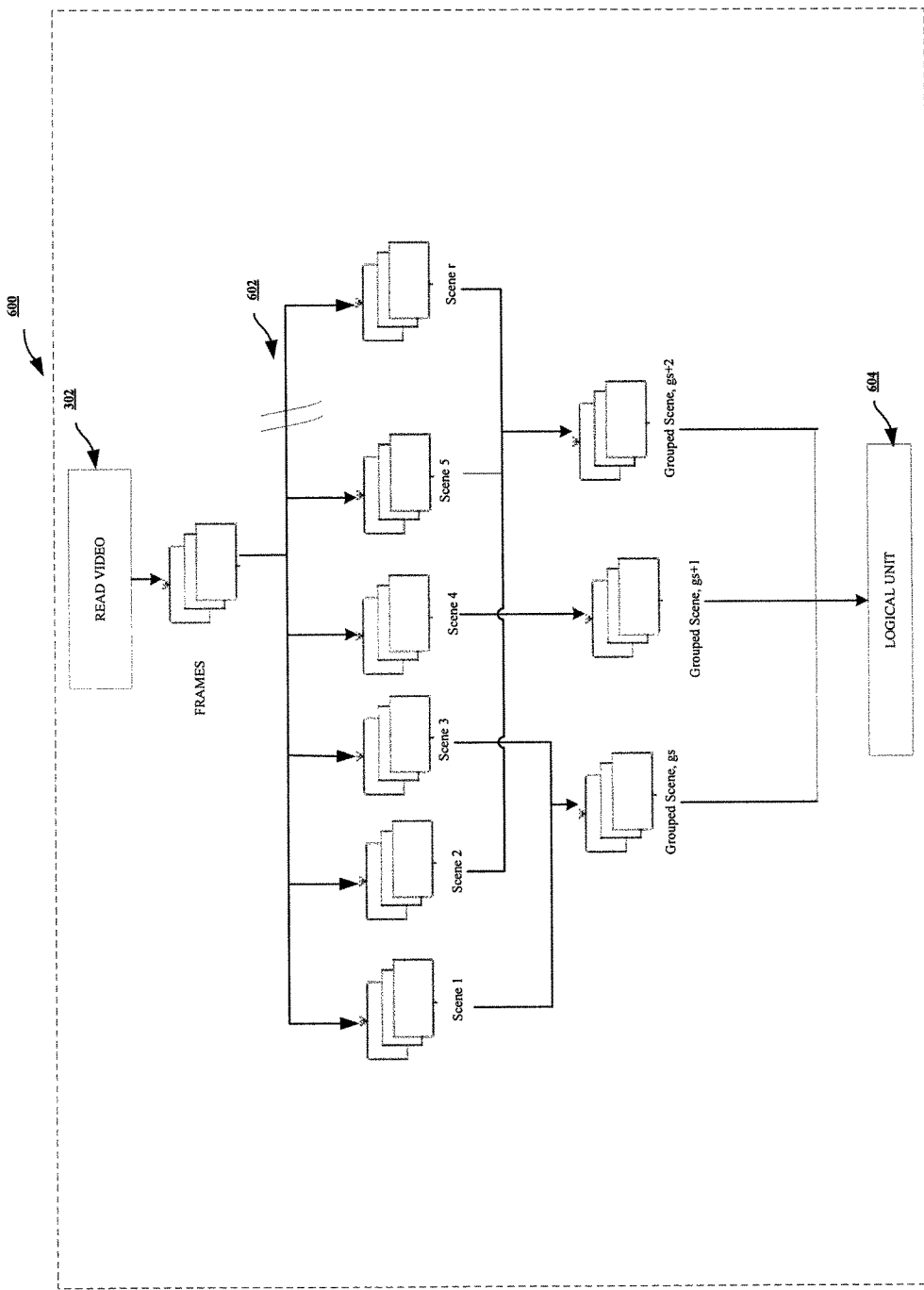
FIG. 6 is a diagram of an example of a method for determining logical scenes in a video.
Figure 7:
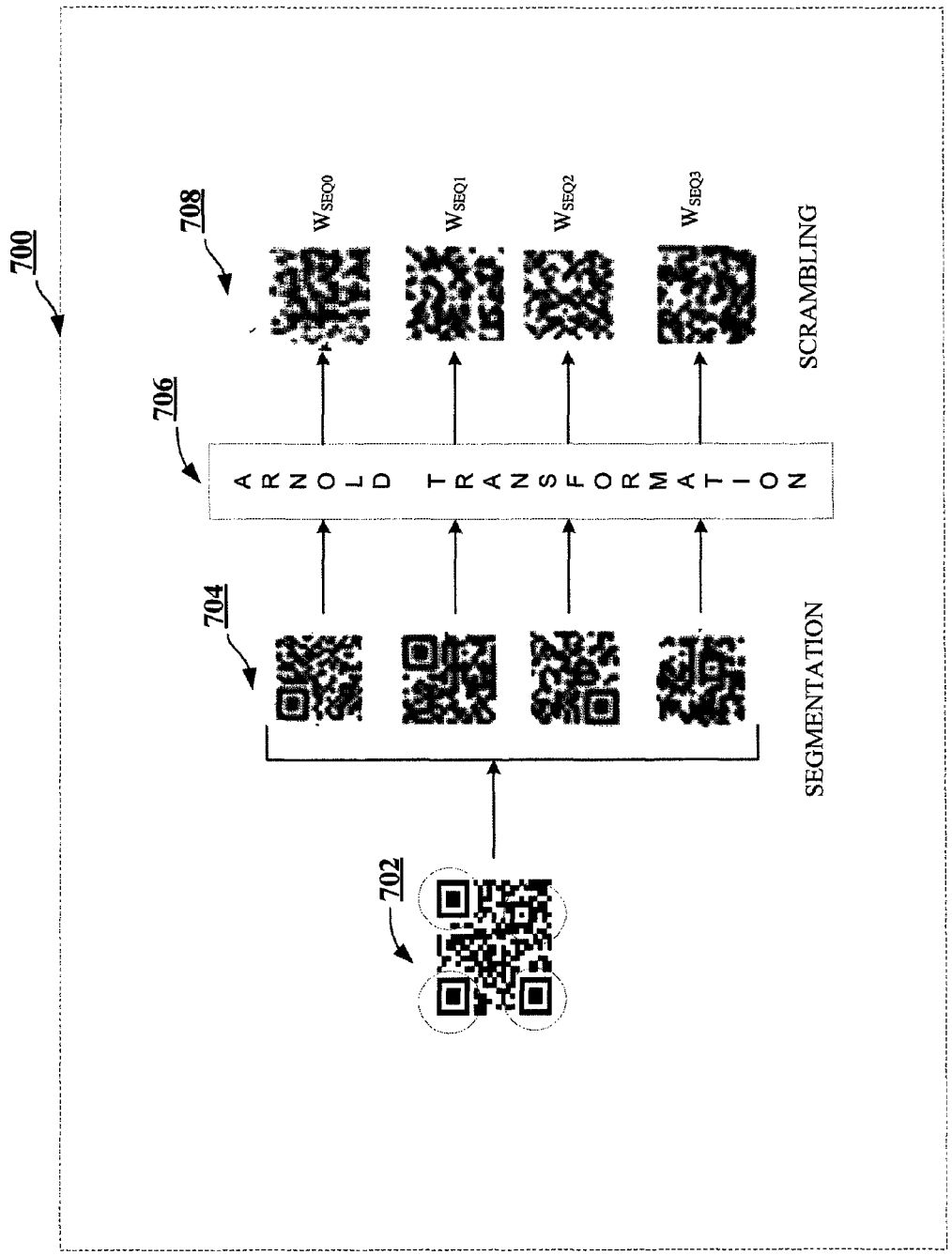
FIG. 7 is a diagram of an example of a method for pre-processing a watermark to be embedded in a final video.

Referring to FIG. 6, an example of a method 600 to logically group sets of scenes, each set comprises similar scenes, in a video in to a logical scene. The term logical scene denotes one or more sets, each set comprising of similar scenes. Determination of logical scenes in a video enables effective video data management and retrieval of information and scenes and embedding of a watermark. A final video 302 is read. A scene change detection algorithm is applied to determine the number of scenes 602 in the video 302. Known scene change detection methods may be applied. A scene averaged image is computed for each scene of the video. The term scene averaged image means an average of corresponding pixels of all the frames in that scene. This is repeated for each scene of the video. Scene averaged image of one scene, for example, $i^{th}$ scene) is compared with that of subsequent scenes except the next scene (scenes i+2 . . . i+n). If the match between two scenes is less than a pre-configured threshold value, the two scenes may be considered as logically similar scenes. Otherwise, the scenes are logically different. All similar scenes are grouped in to Set 1. This process is repeated starting with $(i+1)^{th}$ scene and this compared with i+n and the similar scenes grouped in to Set 2. If m such similar sets are found and all sets lie with in the same range of scenes, for example, if all sets lie between scene 5 and 25 and the scenes are nested then all scenes within that range are grouped together to form a single logical scene 604. The threshold values may be pre-configured based on one or more experimental values Referring to FIG. 7, an example of a method 700 to pre-process a watermark to be embedded in a final video 302. Watermark information is gathered and converted into an image watermark with unique identifiers, preferably QR code 702. Once the watermark 702 has been prepared with the unique identifiers, a segmentation action is performed 704. Segmentation is performed by segmenting the watermark into equal parts based on the number of unique identifiers. The segmentation is done in such a way that each segment contains at least one unique identifier and is independent of the other. Each of the segmented part is scrambled using one or more scrambling functions. In this particular example, an Arnold Transformation 706 is preferably employed for the scrambling operation 708, although other types of approaches could be used. The number of times a scrambling operation is performed, for example 't' times, should be known only to an authorized person or a person responsible for the creation of original video by way of example. This ensures that unauthorized access to watermark information is prevented even if the watermarking algorithm is known to an attacker. The segmented and subsequently scrambled watermark segments 708 may be respectively designated as $Wseq_{(i)}$; where 1≤i≤ number of unique identifiers. Each scrambled watermark is independent of each other and may be embedded inside different scenes of the video in a cyclic manner so as to sustain attacks, for example frame dropping and the like. A scene change detection algorithm is applied to determine the number of scenes in the video 302. Known scene change detection may be applied. Alternatively, scene change detection algorithm in accordance with the present disclosure may be applied. Assume that there are S scenes in the video 206. Initiate threads equivalent to the number of scenes. The number of threads which may be initiated by a system may be limited on the processing capability of the system and can be managed using thread pooling. Now, embed the segments of the watermark in parallel inside the scenes of the video in a cyclic manner. For example, $Wseq_{(0)}$ may be embedded inside scene 0, scene 4, scene 8 and the like. Known watermarking algorithms such as Discrete Wavelet Transform (DWT) based watermarking and Singular Value Decomposition (SVD) based watermarking may by way of example only be used to embed the segments of the watermark. All frames in a scene contain the same segment of the watermark. The scenes may then be combined to get a watermarked video.

Figure 8:
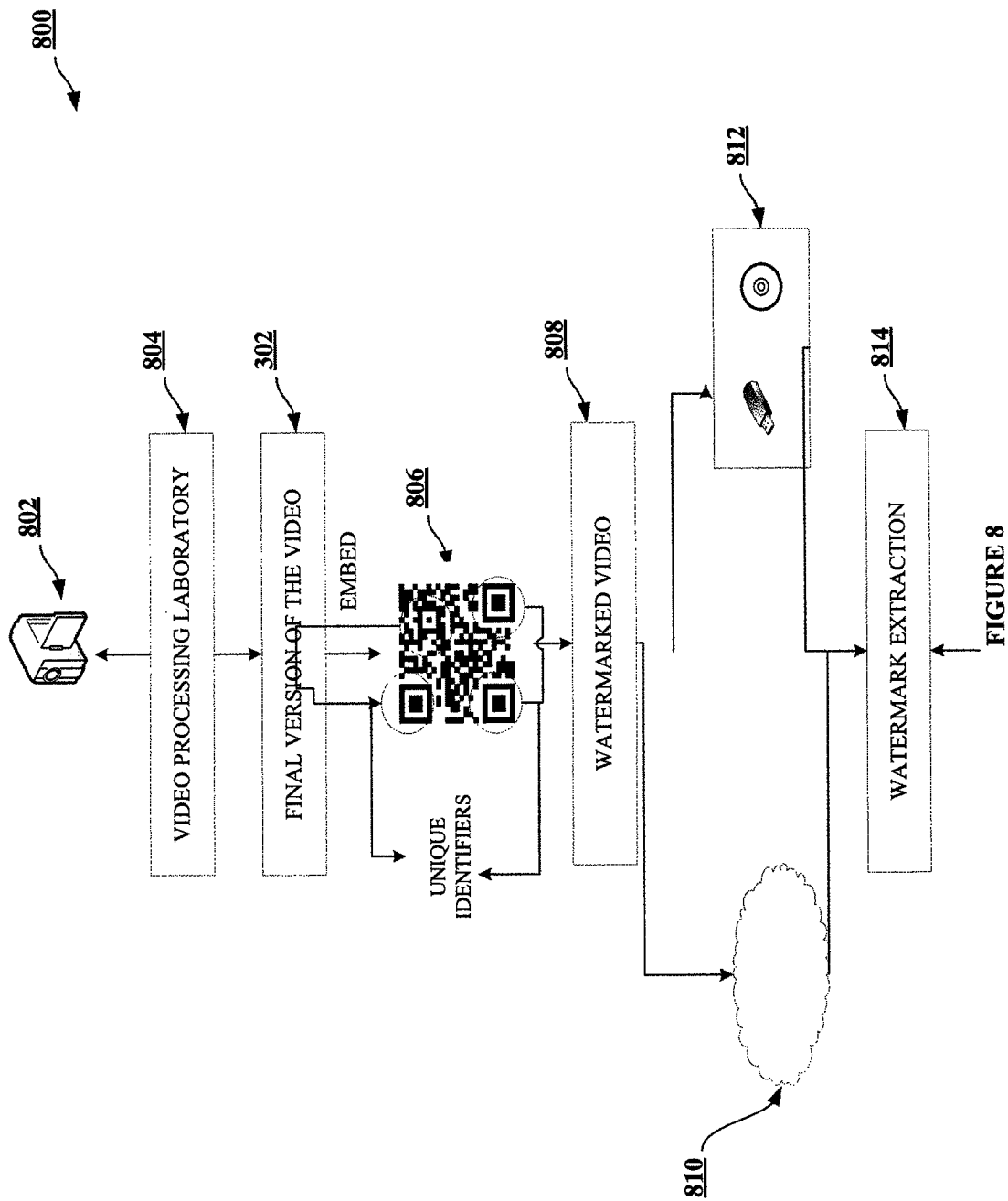
FIG. 8 is a diagram illustrating an example of the utility of this technology.

Referring to FIG. 8, a diagram of an example of a utility of this technology is illustrated. A raw video, which is captured by a camera 802 may be processed inside a video processing laboratory 804. The final video 302 created for an intended purpose is watermarked with the information for example, owner's information, and information about the responsible person, transaction details like time-stamp and the like. A distinct watermark can be embedded for each instance of video whenever a transaction occurs between owner of the video and an end-user. A watermark is a visible, or preferably invisible, identification data that is permanently embedded in the digital data, that is, it remains present within the data after any encoding and decoding process. Preferably, a watermark should be selected to contain some unique identifiers which are independent of the watermark data. The term unique identifier means one or more templates which can be used to identify the watermark used in relation to the final video 302. The unique identifiers may be one or more in number and preferably be located in different regions of the watermark. The embedded watermark information can be recovered from the unauthorized copy which is created by imitating the watermarked video and can be used for detecting the source of the piracy as well as for establishing the owner's rights over the video. Preferably, a Quick Response (hereinafter may be referred to as 'QR') code is selected as watermark. QR codes are two-dimensional barcodes which are small in size and capable of carrying a large amount of information. The data contained in QR code is protected from noise and damage, hence increasing the resilience against common signal processing attacks such as noising. These features of QR code help in achieving two major watermarking requirements, robustness and capacity, without any extra processing. Other image watermarks with unique identifiers may also be employed. The watermark may contain a string which contains the information about the owner, responsible person and transaction information. A watermark with unique identifiers is generated using this information and embedded 806 in the final video 302. The watermarked video 808 may be available through multiple channels to an end-user through a communication network 810 or in the form of a physical media 812 as the case maybe. In case of downloading video from Internet, a download request is sent from a computer to Internet for a video. The download reaches the Web server through a network. The Web server may be operatively connected to a server with an application 104a. An end-user downloads the video and may distribute this video to unauthorized consumers. Any suspect copy of a video may be validated for its authenticity to determine if it is an illegal copy by extracting the watermark information. The extracted watermark 814 contains the information about the responsible person and hence, owner will be able to detect the end-user who violated the copyright chain by distributing the content to unauthorized end-users if it is an unauthorized copy.

Figure 9:
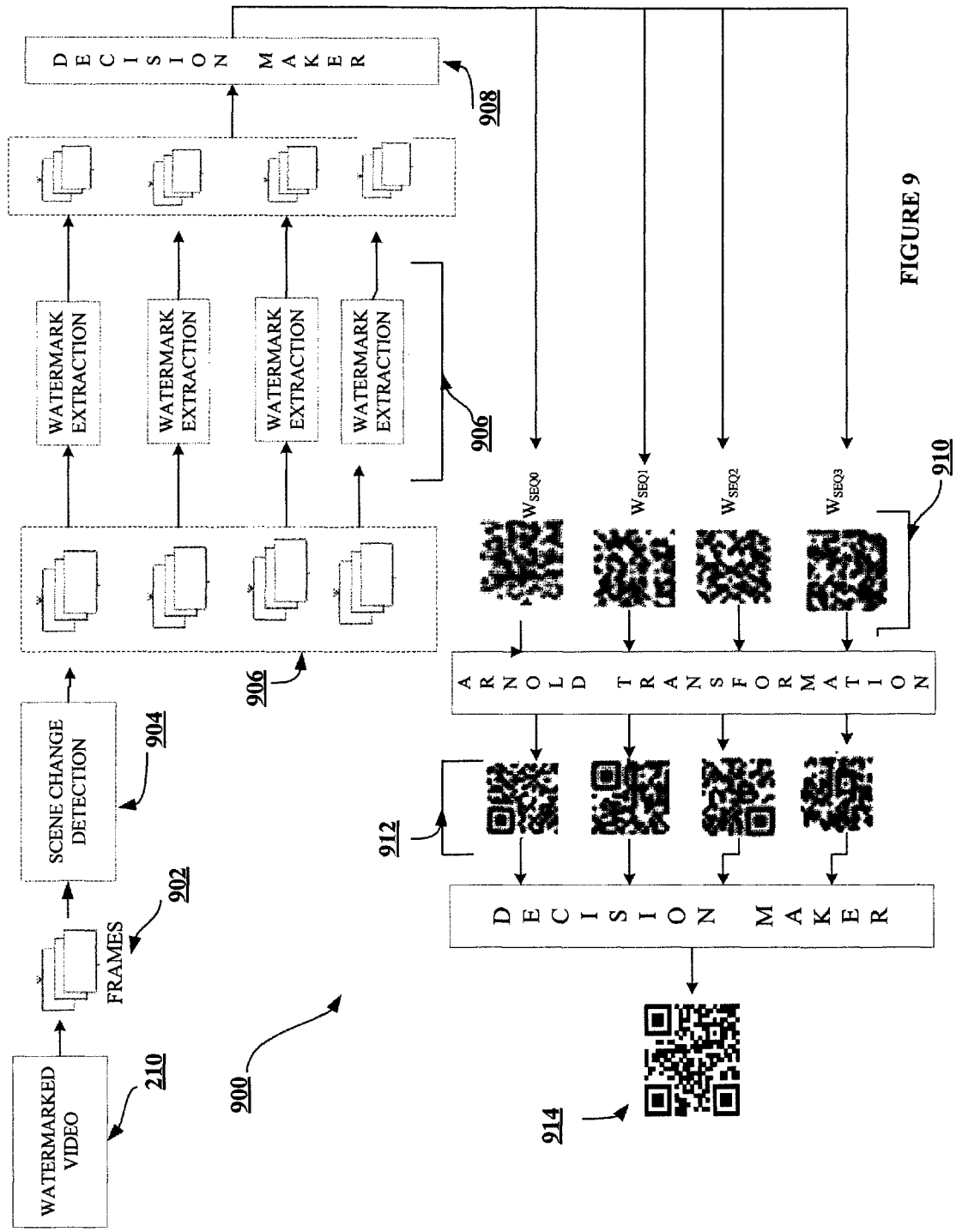
FIG. 9 is a diagram of an example of a method for extracting a watermark from a final video.

Referring to FIG. 9, an example of a method to extract a watermark from a final video is illustrated. The watermarked video 814 is read and divided into frames 902. A scene change detection algorithm is applied 904 to determine the number of scenes in the video by giving the start and the end location of frames of the video 808. The scene change detection method should be the same as the one used during the embedding process. Known scene change detection may be applied. Alternatively, scene change detection algorithm in accordance with the present disclosure may be applied. Then, method for logical grouping of sets of similar scenes may be applied to create logical scenes 600 if exists. Assume that there are S scenes in the video 808. Initiate threads equivalent to the number of scenes. The number of threads may be limited by the capability of the system used for extraction and are managed by thread pooling. Extract the segments of the watermark using the watermarking algorithm as used during the embedding process 906. Since same segment of the watermark is embedded inside all the frames of the scene, the number of segments of the watermark will be the same as the number of frames in a scene. According to an embodiment of the disclosure, a decision maker may be used to combine the segments of the watermark and form one segment of the watermark per scene 908. In this particular, maximum occurrence may preferably be employed for constructing one segment of the watermark per scene, although other approaches could be used. The constructed segments of watermark are in scrambled form 910. Additionally, in this particular example an Arnold Transformation may preferably be applied 't' times to descramble the watermark, although other approaches could be used. The number of times a scrambling operation is performed, for example 't' value, should be known only to authorized user or person responsible for the creation of original video. This ensures that unauthorized access is prevented even if the watermarking algorithm is known to an attacker. One of the common modes of attacking a video is creation or deletion of scenes. This may lead to difficulty in reconstructing the final watermark from the segmented watermark obtained per scene.

According to another example of this technology, the descrambled segments of the watermark may be matched with the unique identifiers in original watermark embedded in the video. A template matching algorithm may be applied on the segments of the watermark per scene, and group them into same number of groups as the number of unique identifiers in the original watermark. Segments of watermark which do not contain any unique identifier are discarded and the ones containing unique identifier are retained. Construct segment of the watermark per group using a decision maker. Now, the number of segments of the watermark is same as at the time of watermark segmentation 704, 912. Combine these segmented watermarks to form the final watermark 914. As the position of unique identifiers is known from the original watermark, superimpose the unique identifiers over the constructed final watermark. Final watermark can be used for copyright protection or traitor tracing.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

As will be appreciated by those ordinary skilled in the art, the foregoing example, demonstrations, and method steps may be implemented by suitable code on a processor based system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

What is claimed is:

1. A method for determining logical scenes in a video, the method comprising:
   identifying, by a media management computing device, a plurality of scenes in a video;
   computing, by the media management computing device, a first scene averaged image of a first scene in the plurality of scenes;
   computing, by the media management computing device, a second scene averaged image of a second scene in the plurality of scenes;
   identifying, by the media management computing device, the first scene and the second scene as a first logical unit when a difference between the first scene averaged image and the second scene averaged image is less than a pre-configured threshold value;
   embedding, by the media management computing device, a first segment of a watermark, the first segment having a first identifier, in each frame of the first logical unit;
   embedding, by the media management computing device, a second segment of the watermark, the second segment having a second identifier, in each frame of a second logical unit; and
   combining, by the media management computing device, the first logical unit having the first segment of the watermark and the second logical unit having the second segment of the watermark to produce the video.

2. The method according to claim 1 further comprising:
   computing, by the media management computing device, a scene averaged image for each of the plurality of scenes in the video; and
   identifying, by the media management computing device, a logical unit for each of the plurality of scenes based on the scene averaged image for each of the plurality of scenes in the video.

3. The method according to claim 1, the method further comprising:
   apportioning, by the media management computing device, the watermark into a plurality of watermark segments each having a corresponding unique identifier; and
   performing, by the media management computing device, a scrambling operation on each of the plurality of watermark segments to create the first watermark segment and the second watermark segment.

4. A media management computing device comprising:
   a processor;
   a memory coupled to the processor which is configured to be capable of executing programmed instructions comprising and stored in the memory to:
   identify a plurality of scenes in a video;
   compute a first scene averaged image of a first scene in the plurality of scenes;
   compute a second scene averaged image of a second scene in the plurality of scenes;
   identify the first scene and the second scene as a first logical unit when a difference between the first scene averaged image and the second scene averaged image is less than a pre-configured threshold value;
   embedding, by the media management computing device, a first segment of a watermark, the first segment having a first identifier, in each frame of the first logical unit;
   embedding, by the media management computing device, a second segment of the watermark, the second segment having a second identifier, in each frame of a second logical unit; and
   combining, by the media management computing device, the first logical unit having the first segment of the watermark and the second logical unit having the second segment of the watermark to produce the video.

5. The device according to claim 4, wherein the processor coupled to the memory is further configured to be capable of executing at least one additional programmed instruction comprising and stored in the memory to:
   compute a scene averaged image for each of the plurality of scenes in the video; and
   identify a logical unit for each of the plurality of scenes based on the scene averaged image for each of the plurality of scenes in the video.

6. The device according to claim 4, wherein the processor coupled to the memory is further configured to be capable of executing the programmed instructions further comprising and stored in the memory to:

apportion the watermark into a plurality of watermark segments each having a corresponding unique identifier; and perform a scrambling operation on each of the plurality of watermark segments to create the first watermark segment and the second watermark segment.

7. A non-transitory computer readable medium having stored thereon instructions which when executed by a processor, cause the processor to perform steps comprising:

identifying a plurality of scenes in a video;

computing a first scene averaged image of a first scene in the plurality of scenes;

computing a second scene averaged image of a second scene in the plurality of scenes;

identifying the first scene and the second scene as a first logical unit when a difference between the first scene averaged image and the second scene averaged image is less than a pre-configured threshold value;

embedding, by the media management computing device, a first segment of a watermark, the first segment having a first identifier, in each frame of the first logical unit;

embedding, by the media management computing device, a second segment of the watermark, the second segment having a second identifier, in each frame of a second logical unit; and combining, by the media management computing device, the first logical unit having the first segment of the watermark and the second logical unit having the second segment of the watermark to produce the video.

8. The medium according to claim 7, wherein the processor coupled to the memory is further configured to be capable of executing at least one additional programmed instruction comprising and stored in the memory to:

computing a scene averaged image for each of the plurality of scenes in the video; and identifying a logical unit for each of the plurality of scenes based on the scene averaged image for each of the plurality of scenes in the video.

9. The medium according to claim 7, wherein the processor coupled to the memory is further configured to be capable of executing the programmed instructions further comprising and stored in the memory to:

apportioning the watermark into a plurality of watermark segments each having a corresponding unique identifier; and performing a scrambling operation on each of the plurality of watermark segments to create the first watermark segment and the second watermark segment.

* * * * *